United States Patent
Huang et al.

(10) Patent No.: US 6,824,807 B2
(45) Date of Patent: Nov. 30, 2004

(54) CHEMICAL LEAVENER SYSTEM COMPRISING ACIDULANT PRECURSORS

(75) Inventors: Victor T. Huang, Moundsview, MN (US); Fern A. Panda, New Brighton, MN (US)

(73) Assignee: The Pillsbury Company, Minneapolis, MN (US)

( * ) Notice: Subject to any disclaimer, the term of this patent is extended or adjusted under 35 U.S.C. 154(b) by 287 days.

(21) Appl. No.: 09/956,323

(22) Filed: Sep. 19, 2001

(65) Prior Publication Data

US 2003/0113424 A1 Jun. 19, 2003

(51) Int. Cl.⁷ .............................................. A21D 10/00
(52) U.S. Cl. ...................... 426/551; 426/552; 426/561; 426/562; 426/653
(58) Field of Search .................................. 426/549, 551, 426/552, 561, 562, 653

(56) References Cited

U.S. PATENT DOCUMENTS

| | | |
|---|---|---|
| 1,974,028 A | 9/1934 | Komm |
| 2,478,618 A | 8/1949 | Armstrong |
| 3,275,450 A | 9/1966 | Holstein |
| 3,275,451 A | 9/1966 | Holstein |
| 4,328,115 A | 5/1982 | Metz |

*Primary Examiner*—Lien Tran
(74) *Attorney, Agent, or Firm*—Dale A. Bjorkman; Douglas J. Taylor; Arlene L. Hornilla

(57) ABSTRACT

Chemical leavener systems are provided for use in flour-containing foodstuffs that contain an enzyme for hydrolyzing an acidulant precursor. The chemical leavener system comprises an acidulant precursor and an alkaline carbonate, wherein the majority of carbon dioxide gas provided by the chemical leavener system when used in a hydrolyzing enzyme-containing foodstuff is created by reaction of an alkaline carbonate with an acid that is the hydrolysis product of the acidulant precursor. Methods of use of the acidulant precursor and the chemical leavener system, and products made by these methods are also provided.

45 Claims, No Drawings

CHEMICAL LEAVENER SYSTEM COMPRISING ACIDULANT PRECURSORS

FIELD OF THE INVENTION

The invention relates to chemical leavener systems comprising acidulant precursors. The invention further relates to a method of preparing dough and batter compositions using the novel chemical leavener systems of the invention and to foodstuffs so prepared.

BACKGROUND OF THE INVENTION

Manufacturers of baked goods, sold either in cooked or raw form, are continually searching for methods to improve the taste and appearance of their products while, at the same time, decreasing product preparation times. Chemically leavened foodstuffs sometimes have an off taste or off flavor due to the particular chemicals used to produce the leavening gases. The term "off taste" or "off flavor" is used to describe a residual chemical taste, which is unpleasant to the consumer and is generally not present in yeast-leavened foodstuffs. In particular, phosphate-containing leaveners are prone to this off taste that is unacceptable to the consumers in many products. While the use of yeast as the leavener would alleviate this problem in dough products, yeast is often an unsuitable alternative due to the time constraints placed upon the manufacturer. That is, chemical leaveners are generally quicker than yeast at leavening products and are, therefore, more desirable from a product preparation standpoint even if they are less desirable from a taste standpoint. Therefore, there is a balance that must be struck with respect to leavening systems. The leavener must work quickly enough to be suited for today's quick manufacturing techniques, yet it must not work too quickly so as to degas entirely during mixing. Finally, the leavener must not produce any off flavors in the end product.

Chemical leaveners exploit the reaction between certain acidic and alkaline carbonate compounds, which results in the evolution of carbon dioxide, the same gas produced by yeast. The alkaline component is almost universally sodium bicarbonate, commonly known as baking soda, but may be selected from any number of alkaline mono- or bi-carbonates including potassium bicarbonate, magnesium bicarbonate, calcium carbonate and mixtures thereof to name a few. Leavening acids are generally known in the industry and include citric acid, sodium acid pyrophosphate (SAPP), sodium aluminum phosphate (SALP), monocalcium phosphate (MCP), either anhydrous or monohydrate, dicalcium phosphate (DCP), dicalcium phosphate dihydrate (DCPD), sodium aluminum sulfate (SAS), dimagnesium phosphate (DMP), gluconodelta lactone (GDL) and mixtures thereof.

Some of these known acids react too quickly with the alkaline component of the leavening system, thus causing excess gas to escape too quickly during mixing. This in turn results in a dense dough or batter and ultimately in a dense foodstuff. Other shortcomings with known acids include shelf life problems. For instance, refrigerated dough products employing SAPP as the acidic component of the chemical leavener system risk the formation of crystalline structures of disodium phosphate dodecahydrate during storage. As discussed above, another shortcoming with SAPP and other acids is their strong off-taste, in particular, a strong phosphate taste with the use of SAPP.

U.S. Pat. No. 1,974,028 to Komm discloses a process for the baking of bread, wherein a flavorful bread can be made by adding a small amount of fatty acid, in addition to lactic acid, to the "paste mixture." The bread is described as being prepared from a dough containing flour substantially free of gluten forming substances. The specification also states that "in place of or as well as the fatty acids, their esters may also be added to the bread" at page 1, lines 82–83.

SUMMARY OF THE INVENTION

The invention provides a chemical leavener system useful in flour-containing foodstuffs that contain an enzyme for hydrolyzing an acidulant precursor. The system comprises an acidulant precursor and an alkaline carbonate. The majority of carbon dioxide gas provided by the chemical leavener system when used in a hydrolyzing enzyme-containing foodstuff is created by reaction of an alkaline carbonate with an acid that is the hydrolysis product of the acidulant precursor.

The invention also includes a dough or batter comprising flour, gluten, water, a chemical leavener system comprising an acidulant precursor and an alkaline carbonate, and an enzyme for hydrolyzing the acidulant precursor as described above.

The invention further includes a method of preparing a dough or batter comprising the steps of combining flour, gluten, water, a chemical leavener system comprising an acidulant precursor and an alkaline carbonate, and an enzyme for hydrolyzing the acidulant precursor as described above The invention further provides a method of preparing a dough-containing comestible comprising mixing flour, gluten, water, a chemical leavener system comprising an acidulant precursor and an alkaline carbonate, and an enzyme for hydrolyzing the acidulant precursor as described above to form a dough.

A method of reducing proofing time of a flour-containing dough is also included. Such method includes adding an excess of acidulant precursor when preparing the dough as described above.

A method of reducing mixing time of a flour-containing dough is also included. Such method includes adding an excess of acidulant precursor when preparing the dough as described above.

DETAILED DESCRIPTION OF THE PREFERRED EMBODIMENTS OF THE INVENTION

The present invention overcomes some of the problems commonly associated with conventional chemical leaveners. The acidulant precursors as discussed herein create enough gas to expand or proof a dough or batter in a suitable amount of time and during the desired product preparation step(s) without producing off flavors in the baked foodstuff. That is, the acidulant precursors of the invention together with an alkaline carbonate of a chemical leavener system produce gas slowly enough that the gas does not entirely escape during mixing of the dough or batter yet quickly enough for use in commercial manufacturing.

Chemical leavener systems of the present invention are minimally comprised of an acidulant precursor and an alkaline carbonate. One or more acidulant precursors may be combined with one or more alkaline carbonates in order to raise or leaven a baked good. Additionally, acidulant precursors may also be combined with known acids and an alkaline carbonate in a dough or batter in order to leaven a baked good, provided that the majority of the carbon dioxide gas used for leavening the product is created by reaction of an alkaline carbonate with an acid that is the hydrolysis product of the acidulant precursor. Additionally, the chemical leavener system of the present invention may be used in combination with yeast.

The term "leavening agent" as used herein may refer to either the acidic (or acidulant precursor) or alkaline component of a chemical leavener system. The term "chemical leavener system" refers to both the acidic (or acidulant precursor) and alkaline components that react to raise a foodstuff.

For purposes of the present invention, an acidulant precursor is an organic ester that, when combined with flour and water in the presence of an enzyme for hydrolyzing in the acidulant precursor, is hydrolyzed to its respective alcohol and acid moieties. For example, acetyl compounds are hydrolyzed into acetic acid and organic alcohols, and ethyl esters are hydrolyzed into organic acids and ethanol. These hydrolyzed by-products are functional, together with the alkaline component of the chemical leavener system, as leavening acids.

The enzyme for hydrolyzing the acidulant precursor is an esterase that catalyzes the hydrolysis of the acidulant precursors to their respective acids and alcohols. It has been found that such enzymes are native to wheat flour, and therefore are provided automatically to the preferred compositions of the present invention when the flour that is used is wheat flour. Optionally, alternative flour that does not naturally contain such enzymes may be used, and the enzymes may be added thereto in an amount effective to hydrolyze the acidulant precursor under conditions of use. This alternative composition is particularly useful in products intended to be consumed by people with an allergy to wheat flour.

As is shown below in the Examples, the rate of the leavening is modified depending upon which acidulant precursor is used. It is believed that the rate of leavening is in part dependent upon the rate of hydrolyzing the acidulant precursor. The present invention is therefore very useful in commercial manufacturing settings of breadstuffs in particular where the product preparation rate is often dependent upon the rate of the leavener used. The resulting acid reacts with the alkaline carbonate component of the chemical leavener system to produce carbon dioxide. The so produced carbon dioxide is released into the dough or batter and thereby increases the volume of the dough to provide a raised foodstuff or baked good.

Types of organic esters that are useful as acidulant precursors of the invention include, but are not limited to, food safe acetyl compounds and ethyl esters. Examples of acetyl compounds include triacetyl glycerol (commonly known as triacetin), diacetyl glycerol (commonly referred to as diacetin), and acetylated monoglycerides, to name a few. Other examples of acetylated compounds include sucrose octa-acetate or triethyl ortho-acetate. Examples of ethyl esters include, but are not limited to, ethyl pyruvate, ethyl acetate, ethyl lactate, and diethyl fumarate. Each of the acidulant precursors is useful in a chemical leavener system either alone or any number of the acidulant precursors may be combined in a single composition or may be combined with other known acids.

For purposes of the present invention, alkaline carbonate means any coordinate compound of carbonate with alkaline, including mono-carbonate compounds and bicarbonate compounds. Suitable alkaline carbonates or bicarbonates used in combination with the acidulant precursors of the invention generally include those alkaline carbonates commonly known in the baking industry. Suitable carbonate and bicarbonate salts include, for example, sodium carbonate, potassium carbonate, sodium bicarbonate (commonly known as baking soda), potassium bicarbonate, magnesium bicarbonate and calcium carbonate and mixtures thereof.

If a dough or batter is prepared, the dough or batter preferably includes less than about 5 percent by weight total leavening agents, more preferably between about 0.1 percent by weight and 3 percent by weight, and most preferably between about 0.5 percent by weight and about 2 percent by weight.

The ratio of leavening acid or the acidulant precursor to alkaline carbonate is dependent upon the neutralizing power of the leavening acid. As is known in the art, the neutralizing power of leavening acids is not uniform and the relative activity of an acid is given by its neutralizing value. The neutralizing value of an acid, or in this case, an acidulant precursor, is determined by calculating the parts by weight of sodium bicarbonate that will neutralize 100 parts by weight of the acidulant precursor (after hydrolysis to the acid). In the presence of natural flour ingredients, the amount of acidulant precursor required to give neutrality or any other desired pH in a baked product may be quite different from the theoretical amount determined for a simple system. However, neutralizing values are useful in determining initial formulations for leavening systems.

The relative amounts of the acidic and basic portions of the leavening system depend on the desired amounts of carbon dioxide production and pH of the dough. Different combinations of leavening agents release gas at different rates. That is, the end product and the desired baked specific volume ("BSV") will often dictate which acidulant precursor and which alkaline carbonate is used in the leavening system of a given foodstuff.

The rate of leavening or of gas production is dependent upon the acidulant precursor used in a given composition. It has been found that the rate at which the chemical leavener system of the present invention produces gas is directly correlated to the rate of hydrolysis of the acidulant precursor. The chemical leaveners of the invention provide bakers and manufacturers great flexibility in preparing leavened foodstuffs. In the chemical leavener system of the present invention, the acidulant precursor may be chosen such that it hydrolyzes and produces carbon dioxide gas during mixing or it may be selected to delay gas production until mixing or any other processing is complete. A slow production of carbon dioxide gas is particularly useful for extruded products, which may lose their leavening gas during extrusion when using conventional chemical leavener systems. In the case of extruded products, manufacturers may want to use an acidulant precursor that does not react with the alkaline component of the chemical leavener system until after extrusion has occurred. The current invention allows selection of a chemical leavener system that will delay the majority of gas production until after mixing and possibly extruding has occurred.

In selecting acidulant precursors for a chemical leavener system, it has been found that triacetyl glycerol, diacetyl glycerol and ethyl pyruvate are relatively fast at leavening a foodstuff when combined with an alkaline component. Ethyl acetate performs more slowly than the mentioned acidulant precursors while ethyl lactate is slower than the ethyl acetate. Ethyl lactate generally performs at about the same rate as SAPP RD-1™ leavening acid would perform when acting to leaven a foodstuff. SAPP RD-1™ leavening acid is available from Astaris LLC located in Webster Groves, Mo. Diethyl fumarate, sucrose octa-acetate, acetylated monoglycerides, and triethyl orthoacetate are among the slowest acidulant precursors of the invention.

Gluten is present in the present invention to provide the matrix for accommodating the leavening gas and allowing the food product of the present invention to raise. When the flour that is used the product to the present invention is wheat, gluten is naturally provided in the wheat flour, and no additional gluten need be added to the composition. Other flours may alternatively be used, with the addition of gluten as required so that the end food product may be leavened. It will be appreciated that a highly preferred embodiment of the present invention therefore utilizes wheat flour in combination with the chemical leavening system of the present invention, because the gluten and the enzyme for hydrolyzing the acidulant precursor are automatically included in the food product of the present invention at very low cost and without additional processing steps.

Any food product that can be prepared using a chemical leavening system will potentially benefit from the present invention. Leavened dough products are bread-like products or, as used herein, breadstuffs. When using the term breadstuffs we are referring to any type of bread, bun, biscuit, roll, scones, raised pizza crust, bagel, or donut product, to name a few, having greater than about 2.0 cc/g baked specific volume. Additionally, the term breadstuff may refer to food filled products such as TOASTER STRUDEL™, TOASTER SCRAMBLE™ or TOASTER BAGEL™ products available from The Pillsbury Company located in Minneapolis, Minn. The chemical leavener of the invention is also useful in batters. Batters are generally used to prepare muffins, cakes, pancakes, waffles, and popovers to name a few. The term "baked good" or "foodstuff" is used herein to refer to products prepared either from doughs or batters all of which employ a chemical leavener system in order to raise the product. The term "baked specific volume" ("BSV") is a term of art generally known in the industry to define the inverse of density or fluffiness of a baked good.

The term "baked" specific volume is used herein even though the final products employing the acidulant precursors of the present invention are cooked using any known cooking technique that is suitable and desirable for the type of product. The term "cooking" or "cooked" as used herein refers to any appropriate method for preparing a cooked food product, including baking or frying.

Foodstuffs that benefit from the acidulant precursors of the invention are either filled or unfilled and are cooked either by the manufacturer or the consumer by any method suitable for the particular product. The acidulant precursors of the invention are useful in doughs or batters that are partially or fully cooked by the manufacturer, or are not cooked by the manufacturer but rather sold as refrigerated or frozen dough or batter for cooking by the consumer.

Following completion of the leavening process or of the gas production and depending upon the acidulant precursor used, the anion of the leavening acid and the cation of the alkaline carbonate generally remain in the dough as a by-product of the leavening agent. However, if for example ethyl acetate is used as the acidulant precursor, the ethanol that is a by-product of the hydrolysis reaction evaporates and does not remain in the dough after baking. The other by-product of this hydrolysis reaction, acetic acid, does remain in the dough after baking. On the other hand, if for example triacetin is used as the acidulant precursor, the acetic acid and glycerol, which are by-products of the hydrolysis reaction, both remain in the dough after baking.

In addition to their functionality as carbon dioxide generators in chemical leavener systems, the acidulant precursors of the invention may provide additional functionality. As explained above, the acidulant precursors are hydrolyzed and the by-products of the hydrolysis may remain in the batters or doughs, provided that the hydrolysis by-products are not volatilized after hydrolysis. Such hydrolysis by-products may carry out another function in addition to their use as chemical leavener systems. For instance, ethanol is a hydrolysis byproduct from the hydrolysis of ethyl acetate. Similarly, glycerol is a hydrolysis reaction product from the hydrolysis of triacetin. Both of these by-products are useful as gluten plasticizers in doughs. Other acidulant precursor hydrolysis byproducts are useful as sweeteners. For example, sucrose is hydrolyzed from sucrose octa-acetate. Yet another advantage is that certain hydrolyzed acidulant precursors can act as preservatives. Acetic acids, which result from the hydrolysis of ethyl acetate and triacetin, prevent mold from growing in baked products during shelf-life storage. Likewise, lactic acid, which results from the hydrolysis of ethyl lactate, will also prevent mold. Ethanol, which results from the hydrolysis of ethyl ester, is also antimicrobial and helps to increase BSV. In fruit-filled products, the acidic flavor provided by acetic acid enhances the flavor of the product.

Another advantage of using the acidulant precursors of the invention in chemical leaveners is that they are relatively more tolerant to high processing temperatures than their known counterparts. Due to the fact that the acidulant precursors of the invention must first hydrolyze, they generally react much more slowly with the alkaline component of the chemical leavener than known leavening acids. For example, when preparing a batter or dough that is mixed or combined at a relatively high temperature, prior art chemical leavener systems containing many fast-reacting leavening acids such as MCP and fast SAPPs tend to lose excessive amounts of carbon dioxide during mixing at about 90 to 110 degrees Fahrenheit. However, since acidulant precursors of the invention, such as triacetin, do not react immediately, the amount of carbon dioxide lost during mixing is relatively small. Thus, the acidulant precursors of the invention are extremely useful in preparing products requiring relatively high temperature processing.

The acidulant precursors of the present invention are also useful as a type of conditioner, particularly in doughs. The acidulant precursors of the invention may be used solely as a chemical leavening agent or may be used in combination with known chemical leavening acids as a conditioner. When using the term "conditioner" or "conditioning" we are referring to the reduced mixing and proofing times associated with doughs and batters, particularly doughs, employing an excess of the acidulant precursor as compared to like doughs that do not contain excess acidulant precursor. Excess acidulant precursor may be added to a dough or batter such that not all of the acidulant or the hydrolyzed acidulant is used during the leavening reaction. The unreacted hydrolyzed acidulant or the unhydrolyzed acidulant precursor is then available as a conditioner. While not being bound by theory, it is believed that the organic esters used as the acidulant precursors interact with the gluten, making the gluten a better gas-holding structure.

The present invention also provides a method of preparing a dough or batter comprising mixing wheat flour, water, and a chemical leavener system comprising an acidulant precursor and an alkaline carbonate in amounts appropriate to make a dough or batter. The majority of carbon dioxide gas provided by the chemical leavener system is created by reaction of an alkaline carbonate with an acid that is the hydrolysis product of the acidulant precursor. The ingredients may be combined simultaneously, or may be added in stages or as premixes as will be understood by persons of skill in this art. For example, a dough or batter may be prepared by first preparing a first stage pre-mix, including wheat flour, water, and an acidulant precursor. A second stage pre-mix may be prepared comprising shortening and an alkaline carbonate. Additional ingredients, such as fats, sweetener, flavoring agents and the like may be added to either pre-mix. The first stage and second stage premixes are then combined to form a batter or dough.

The dough or batter so prepared may be baked immediately, or stored in the refrigerator or freezer for later baking.

A mixture of flour and water is either a dough or a batter depending upon the relative proportions of the two major ingredients. In doughs, the water content is generally low enough that the hydrated gluten constitutes the continuous phase in which the other components (starch granules, gas pockets) are embedded. In batters, which usually contain much more water then do doughs, the sweetener solution generally is the continuous phase in which the proteins, starch and gas, are dispersed. In batters, the gluten is not developed. Generally, doughs are stiff enough to be manipulated by hand while batters are thin enough to pour. No matter what the particular ratio of water to flour, other ingredients may be added to this mixture. These include, but are not limited to, leavener(s), shortening or fat, milk, eggs, sugar and salt. As previously stated, products prepared from both doughs and batters benefit from the present invention. Doughs are discussed first, followed by a discussion of batters.

Doughs

Doughs that benefit from the acidulant precursors of the present invention minimally include an acidulant precursor, wheat flour, water, and an alkaline carbonate leavening agent. Other ingredients may be added to the dough such as fats, sweeteners, flavoring agents, emulsifiers, preservatives, or browning agents and the like. For the flour component, the invention requires at least the presence of wheat flour. Nonwheat flours may be added to the composition in combination with the wheat flour as desired for texture and/or flavor. Wheat flour is required in the dough of the present invention because it is believed that esterases are responsible for catalyzing the hydrolysis of the acidulant precursors, and it is known that wheat flours contain these native enzymes. The flours, whether wheat or nonwheat, may be whole grain flours, flours with the bran and/or germ removed, bleached or unbleached, or combinations thereof. Generally the dough includes up to about 70 percent by weight flour, preferably from about 30 to about 60 percent by weight flour, and more preferably from about 40 to about 55 percent by weight flour.

Water is a necessary ingredient in doughs using the inventive chemical leavener system. Water is added to the dough as liquid water, ice, or it is added via hydrated ingredients. Ice is added to supply water to doughs in order to keep the combination cool during mixing. Water is present in the dough in the amount up to about 50 percent by weight, more preferably between about 25 and 45 percent by weight.

A leavening system employing a chemical leavener of the invention is included in a dough composition in an amount sufficient to raise the breadstuff. Any of the acidulant precursors provided by the invention are suitable for use in raising breadstuffs. A single acidulant precursor may be used in a given dough composition or more than one acidulant precursor may be used in a given dough composition. One or more alkaline carbonates may be used in combination with the acidulant precursors in order to comprise a chemical leavener system suitable for raising the given dough composition. Additionally, acidulant precursors of the invention may be used in combination with known acids in combination with an alkaline carbonate.

The dough can also include a sweetener, which may be provided either as a natural or artificial sweetener or as a liquid or dry ingredient. Suitable sweeteners include but are not limited to lactose, sucrose, fructose, dextrose, maltose, corresponding sugar alcohols, corn syrup, malt, hydrogenated corn syrup, maltodextrin, and mixtures thereof. Such sweeteners may act either or both as flavoring agents, texturizing, or browning agents.

A dough composition employing the acidulant precursors of the present invention may optionally include additional flavoring agents. Such flavoring agents include but are not limited to such ingredients as salt, milk and milk products, eggs and egg products, cocoa, whey, malt, yeast, yeast extract, inactivated yeast, spices, herbs, and vanilla. The optional flavoring agent preferably comprises from above about 0.1 percent by weight, and more preferably from about 0.5 and about 5.0 percent by weight of the dough.

Besides flavoring agents, the dough can further include preservatives, emulsifiers and conditioners. Suitable emulsifiers include, for example, mono- and di-glycerides of fatty acids, propylene glycol mono- and di-esters of fatty acids, glycerol-lacto esters of fatty acids, ethoxylated monoglycerides, lecithin, protein, and mixtures thereof. Preferred emulsifiers include mono-glycerides and mixtures of propylene glycol mono- and di-esters of fatty acids, monoglycerides and lecithin. Suitable conditioners assist with dough relaxation, which include, for example, potassium sorbate, L-cysteine and sodium bisulfite. Preservatives, emulsifiers, and conditioners comprise combined preferably less than about 5 percent by weight of the dough, and each preferably between about 0.1 percent and about 2.5 percent by weight of the dough.

Dough products employing the invention can either be filled or unfilled. If the dough is extruded and if a filling is desired, the extruder can be fitted with a filling pump, such that dough reaching the die surrounds a filling and forms a coextrusion. Coextrusion is well known in the art. The relative amount of filling and dough is adjusted by the relative speed of the extruder screw and the flow rate of the filling. When a filling is used, a structure of the dough surrounding the filling exits from the die during the extrusion process. The shape and size of the extrudate of the filling surrounded by dough depends on the shape and size of the die. The filled extrudate can be cut to a desired length. Once cut, the dough can be sealed at the ends to secure the filling within the dough. Filled dough product may also be prepared by first sheeting the dough, then filling and crimping.

The filling, if any, is a raw or cooked food product. The filling can have a uniform consistency or a chunky consistency. In preferred embodiments, the filling is a highly viscous liquid, suspension or pseudoliquid, i.e., a flowable mixture of particulates and/or liquid that may not normally be a liquid or a suspension. The material preferably is highly viscous such that it will not flow immediately through any imperfection in a dough covering or out from the ends of seams of the product when cut and crimped after exiting an extruder.

The filling can be made from any type or types of food ingredients, including savory or sweet ingredients. Examples of savory ingredients include but are no limited to meat, vegetable, and dairy ingredients. Examples of sweet ingredients include but are not limited to fruit or icing ingredients. Both savory and sweet ingredients may further include spices, herbs, flavoring agents, fats, and the like. The filling may further include such ingredients as preservatives and consistency modifiers such as emulsifiers and thickening agents.

The acidulant precursors as described herein are also useful as a type of conditioner, particularly in doughs. The acidulant precursors as described herein may be used solely as a chemical leavening agent or may be used in combination with known chemical leavening acids as a conditioner. When acting as a dough conditioner the acidulant precursor acts to reduce proofing times and to reduce mixing times normally required for dough-containing products. Excess acidulant precursor may be added to a dough or batter such that not all of the acidulant precursor or the hydrolyzed acidulant is used during the leavening reaction. The unreacted hydrolyzed acidulant precursor is then available as a conditioner. It has further been discovered that breadstuffs have a greater baked specific volume when employing the acidulant precursors of the invention beyond their use as a chemical leavening acid.

Batters

Batters that benefit from the acidulant precursors of the present invention minimally include an acidulant precursor, wheat flour, water, and an alkaline carbonate leavening agent. Other ingredients may be added to the batter such as fats, flavoring agents, emulsifiers, surfactants, or browning agents and the like. For the flour component, the invention requires at least the presence of wheat flour. Nonwheat flours may be added to the composition in combination with the wheat flour as desired for texture and/or flavor. The presence of wheat flour is required because it is believed that esterases are responsible for catalyzing the hydrolysis of the acidulant precursors, and it is known that wheat flours contain these native enzymes. The flours, whether wheat or nonwheat, may be whole grain flours, flours with the bran and/or germ removed, bleached or unbleached, or combinations thereof. The amount of flour will be dependent upon the type of batter or end product desired. Generally the batter includes between about 15 percent by weight flour, up to about 60 percent by weight flour. One skilled in the art will recognize that sweeter products such as muffins contain less flour because sugar is added in place of flour.

Water is a necessary ingredient in batters using the invention acidulant precursors. Water is added to the batter as liquid water or it is added via hydrated ingredients. Alternatively, ice could be added to the batter to both keep the batter cold and to add water. Water is present in the batter in the amount of about 20% up to about 65% by weight Generally, more water is required to form a batter than is required to form a dough.

A leavening system employing an chemical leavener of the invention is included in a batter composition in an amount sufficient to raise the foodstuff. Any of the acidulant precursors provided by the invention are suitable for use in raising foodstuffs. A single acidulant precursor may be used in a given batter composition or more than one acidulant precursor may be used in a given batter composition or an acidulant precursor may be used in combination with a known acid. One or more alkaline carbonates may be used in combination with the acidulant precursor in order to comprise a chemical leavener suitable for raising the given batter composition. Additionally, acidulant precursors of the invention may be used in combination with known acids in combination with an alkaline carbonate.

The batter can also include a sweetener, which may be provided either as a natural or artificial sweetener or as a liquid or dry ingredient. Suitable sweeteners include but are not limited to lactose, sucrose, fructose, dextrose, maltose, corresponding sugar alcohols, corn syrup, malt, hydrogenated corn syrup, maltodextrin, and mixtures thereof. Such sweeteners may act either or both as flavoring agents, texturizing, or browning agents.

A batter composition employing the acidulant precursors of the present invention may optionally include additional flavoring agents. Such flavoring agents include but are not limited to such ingredients as salt, milk and milk products, eggs and egg products, cocoa, whey, malt, yeast, yeast extract, inactivated yeast, spices, herbs, and vanilla. The optional flavoring agent preferably comprises from above about 0.1 percent by weight, and more preferably from about 0.5 and about 5.0 percent by weight of the batter.

Besides flavoring agents, the batter can further include preservatives, emulsifiers, and conditioners. Suitable emulsifiers include, for example, mono-glycerides of fatty acids, propylene glycol mono- and di-esters of fatty acids, glycerol-lacto esters of fatty acids, ethoxylated monoglycerides, lecithin, protein, and mixtures thereof. Preferred emulsifiers include mono-glycerides and mixtures of propylene glycol mono- and di-esters of fatty acids, monoglycerides and lecithin. Suitable conditioners assist with batter relaxation, which include, for example, potassium sorbate, L-cysteine and sodium bisulfite. Preservatives, emulsifiers, surfactants, and conditioners comprise combined preferably less than about 5 percent by weight of the batter, and each preferably between about 0.1 percent and about 2.5 percent by weight of the batter.

The Examples provided below demonstrate the usefulness of the invention in chemical leavener systems to leaven foodstuffs and in doughs as conditioners.

EXAMPLES

Examples 2 and 3 and Comparative Example 1

These examples and comparative examples demonstrate that the acidulant precursors of the invention, ethyl acetate and triacetin, perform as well as GDL in preparing bread.

Three bread doughs were prepared. The dough of Comparative Example 1 was a control dough and was prepared using GDL as the acidulant. Example 2 dough was prepared using triacetin as the acidulant precursor. Example 3 dough was prepared using ethyl acetate as the acidulant precursor. The doughs had the following formulations with all ingredients provided on a weight percent basis of the total dough composition:

TABLE 1

| Ingredient | Comparable Example 1 % By Weight | Example 2 % By Weight | Example 3 % By Weight |
| --- | --- | --- | --- |
| Flour | 53.73 | 54.66 | 55.39 |
| Water (50% Ice) | 30.90 | 30.78 | 29.04 |
| Xanthan Gum | 0.15 | 0.15 | 0.15 |
| Vital Wheat Gluten | 3.07 | 3.07 | 3.07 |

TABLE 1-continued

| Ingredient | Comparable Example 1 % By Weight | Example 2 % By Weight | Example 3 % By Weight |
|---|---|---|---|
| Azodicarbonamide | 0.004 | 0.004 | 0.004 |
| Corn Starch & Tricalcium Phosphate | 0.036 | 0.036 | 0.036 |
| Soy Shortening | 2.00 | 2.00 | 2.00 |
| Edible Alcohol | 2.14 | 2.14 | 2.14 |
| Yeast Flavor | 0.56 | 0.56 | 0.56 |
| Ethyl Acetate | 0.00 | 0.00 | 1.50 |
| Triacetin | 0.00 | 0.49 | 0.00 |
| GDL | 1.30 | 0.00 | 0.00 |
| Encapsulated Soda* | 1.12 | 1.12 | 1.12 |
| Salt | 0.99 | 0.99 | 0.99 |
| Dextrose | 2.00 | 2.00 | 2.00 |
| Sugar | 2.00 | 2.00 | 2.00 |
| Total | 100.00 | 100.00 | 100.00 |
| Brabender Units | 930 | 940 | 980 |

*60% active

The First Stage ingredients of flour, gluten, xanthan gum, azodicarbonimide, water, shortening, topnote, corn starch and tricalcium phosphate, and yeast flavor were added to a mixing bowl that had been cooled in a refrigerator. One half of the water was added as ice to ensure that the dough mix temperatures remained at a low temperature. The First Stage Ingredients and in the case of Example 3 the ethyl acetate were then mixed in a Model A-200 Hobart mixer manufactured by Hobart Corporation of Troy, Ohio on speed one for 30 seconds and speed two for 6.0 minutes.

The second stage ingredients of sucrose, dextrose, and salt were added to the first stage ingredient combination. Additionally, encapsulated soda, salt, GDL, and triacetin were added to their respective doughs as identified in the Table 1 above. The first and second stage ingredients were mixed on speed one for 30 seconds followed by a 3 minute mix on speed two.

Each dough was then sheeted to a thickness of 5 mm using a Rondo Sheeter Model S™513 manufactured by Sewer GmbH & Company located in Burgdorf, Switzerland. The dough was then cut into 3.5-inch wide strips having a target weight of 200+/−1 gram. Each strip was sprayed lightly with water to enhance melding of the dough and then rolled lengthwise to form a loaf. The dough loaves were placed in 204×400 spiral composite cans manufactured by Sonoco Products of Hartsville, S.C. and seamed within 15 minutes of completing the dough. The full cans were placed at 22° C. for 3.25 hours to allow the dough to proof. Refrigeration at 5° C. of the filled, proofed dough cans followed. Cans were refrigerated for at least four days before the dough was baked in a pre-heated oven at 177° C. for 34 minutes.

The can pressure before baking was measured along with the proof rate. Proof rates were measured using a Risograph Model #1260-R available from R Design of Pullman, Wash. which measured cumulative carbon dioxide volume in cc after the 100 gram sample of dough had proofed at room temperature for 3 hours. After baking, the baked specific volume was measured in cc/g. Results are provided in Table 2 below.

TABLE 2

| Dough | Acidulant Precursor | Proof Rates (Cumulative $CO_2$ in cc at 3 Hours) | Baked Specific Vol (cc/g) |
|---|---|---|---|
| Comparative Example 1 | GDL | 54 | 4.2 |
| Example 2 | Triacetin | 68 | 4.0 |
| Example 3 | Ethyl Acetate | 69 | 4.2 |

The baked specific volumes of the Examples were similar to that of the Comparative Example. Breads resulting from Examples 2 and 3 employing the acidulant precursors triacetin and ethyl acetate, respectively, had very good bread flavor. After storing for 14 days at 5° C., bread prepared using the Example 3 dough employing ethyl acetate had fewer off flavors as compared to breads prepared from doughs of the Comparative Example 1. The term "off flavors" is used to describe chemical tastes generally foreign to yeast leavened dough products and to those tastes that consumers find objectionable.

Comparative Examples 4 and 6 and Example 5

These Examples and Comparative Example demonstrate the use of the acidulant precursors of the invention in combination with known acids. Otherwise stated, the acidulant precursors of the invention are used as conditioners in Examples 5 and 6.

Doughs employing the acidulant precursors of the invention demonstrate a reduced mixing time, reduced proof times, and increased BSV in the final product. The dough of Comparative Example 4 was prepared using SAPP RD-1™ leavening acid available from Astaris and SALP alone as the acid. The doughs of Examples 5 and 6 were prepared using triacetin (Example 5) and ethyl acetate (Example 6) in combination with SAPP and SALP.

TABLE 3

| Ingredient | Comparative Example 4 Percent by Weight | Example 5 Percent by Weight | Example 6 Percent by Weight |
|---|---|---|---|
| Flour | 59.50 | 59.90 | 57.50 |
| Water | 34.01 | 32.11 | 34.01 |
| Shortening | 3.00 | 3.00 | 3.00 |
| Triacetin | 0.00 | 1.50 | 0.00 |
| Ethyl Acetate | 0.00 | 0.00 | 2.00 |
| Salt | 1.00 | 1.00 | 1.00 |
| SAPP | 1.07 | 1.07 | 1.07 |
| SALP | 0.32 | 0.32 | 0.32 |
| Soda | 1.10 | 1.10 | 1.10 |
| Total | 100.00 | 100.00 | 100.00 |

Batches of dough having the above formulations were mixed in a farinograph having a temperature of 15.1 degrees C. All First Stage ingredients, which included all of the solids except the leaveners and salt, (flour and shortening) were added to the mixer. Water was then added to the mixer. The mixer was started and the sides were scraped down after 30 seconds of mixing. Each dough was mixed until 1 minute past peak.

The Second Stage ingredients, including the leavening agents and the salt were then added to the First Stage combination. This combination was mixed for 3 more minutes.

The resulting dough was weighed into 200 gram pieces. Each 200-gram piece of dough was sheeted to a thickness of ¼ inch.

Each sheeted dough was then rolled tightly. The edges were pinched in order to hold the final edge in place. Each loaf was placed seam side down in a greased aluminum pup loaf pan. The doughs were then proofed at 32° C., 85% humidity until the dough reached a height of 2.25 inches.

Each proofed loaf was baked in a preheated oven at 177° C. for 34 minutes and allowed to cool for 45 minutes. After cooling the BSV of each loaf was measured using rapeseed displacement. Results are shown in Table 4 below.

TABLE 4

|  | Comparative Ex. 4 | Example 5 | Example 6 |
|---|---|---|---|
| Additional Acidulant Precursor | None | 1.5% Triacetin | 2% Ethyl acetate |
| Mix time (min) | 6.0 | 3.5 | 4.3 |
| Brabender Units | 910 | 1000 | 940 |
| Proof Time (min) | 90 | 30 | 55 |
| Baked Specific Volume (cc/g) | 3.2 | 4.1 | 4.2 |

The results shown in Table 4 show that the doughs that included the triacetin and ethyl acetate (Example 5 and 6 doughs) had shorter mix times and shorter proof times. Additionally, the bread resulting from these doughs had greater baked specific volumes than the bread resulting from the dough that did not include the acidulant precursors of the invention (Comparative Example 4).

Example 7

Example 7 demonstrates the different rates at which the acidulant precursors of the invention, together with a known alkaline bicarbonate, produce carbon dioxide in the presence of flour and water. 1.1 percent by weight baking soda ($NaHCO_3$) was combined with 33 percent by weight flour and 61–65% by weight water (shown as samples A–E, G–J). Enough of each of the acidulant precursor was added to each sample to neutralize the soda. Samples F and K were added as controls or comparative samples. In Sample F, the acid used in the combination was SAPP RD-1™ leavening acid. In Sample K, no acidulant precursor was added, instead, baking soda was added in the amount of 1.10% by weight and water was added at 65.9% by weight. The ingredients were stirred briefly with a spoon until the flour was wet. Next, the samples were mixed using a hand held electric mixer until smooth, approximately 15 seconds. One hundred grams of each sample was measured into a Risograph jar. Each combination was held at 25 degrees C. for 14 hours in a Risograph jar while gas evolution measurements were taken by a Risograph Model 1260-R. The Risograph quantified the amount of gas evolved from each combination.

TABLE 5

| Sample | Acidulant Precursor* |
|---|---|
| A | Triacetin** |
| B | Diacetin |
| C | Ethyl Pyruvate |
| D | Ethyl Acetate |
| E | Ethyl Lactate*** |
| F | SAPP |
| G | Diethyl Fumarate |
| H | Triethyl Orthoacetate |
| I | Acetylated Monoglyceride |
| J | Sucrose Octaacetate |
| K | None |

*All acidulant precursors, unless otherwise noted were obtained from Aldrich Chemical located Milwaukee, WI. Only 50% pure diacetin was available with the remaining concentration unspecified.
**Eastman Chemical Company located in Kingsport, TN
***Available from Purac America as Purasolv EL ™.

TABLE 6

| | Gas Evolved Over Time | | | | | |
|---|---|---|---|---|---|---|
| Sample | 0.5 Hour | 1 Hour | 3 Hours | 6 Hours | 10 Hours | 14 Hours |
| A | 34 | 92 | 203 | 234 | 240 | 243 |
| B | 20 | 59 | 153 | 191 | 203 | 209 |
| C | 38 | 75 | 140 | 178 | 199 | 207 |
| D | 10 | 22 | 86 | 149 | 186 | 201 |
| E | 4 | 6 | 19 | 58 | 114 | 156 |
| F | 7 | 11 | 20 | 54 | 121 | 137 |
| G | 6 | 9 | 20 | 40 | 64 | 84 |
| H | 6 | 10 | 28 | 52 | 69 | 75 |
| I | 7 | 12 | 26 | 43 | 59 | 69 |
| J | 3 | 5 | 10 | 19 | 39 | 62 |
| K | 5 | 7 | 11 | 13 | 14 | 15 |

The data shown in Table 6 illustrates that triacetin (Sample A) was the fastest at producing gas. The diacetin (Sample B) was also fast; however, since pure diacetin was unavailable it is difficult to predict its actual rate of gas production. Ethyl pyruvate (Sample C) was also very fast. Ethyl acetate (Sample D) was slightly slower than triacetin. The gas production of ethyl lactate (Sample E) is most similar to that of SAPP RD-1™ leavening acid (Sample F). The remaining samples produced less gas than SAPP RD-1™ leavening acid while Sample K that included no acidulant, produced nominal amounts of gas.

The embodiments described herein are illustrative in nature and not intended to limit the scope of the invention. One skilled in the art will recognize that variations are possible without departing from the spirit or scope of the invention.

We claim:

1. A farinaceous food product comprising
   an enzyme for hydrolyzing an acidulant precursor;
   a chemical leavener system comprising an acidulant precursor and an alkaline carbonate;
   and an acid produced from hydrolyzing said enzyme with said acidulant precursor;
   wherein a reaction of said alkaline carbonate and said acid produces carbon dioxide gas.

2. The food product of claim 1, wherein said acidulant precursor comprises an acetyl compound.

3. The food product of claim 2, wherein said acetyl compound is selected from the group consisting of triacetyl glycerol, diacetyl glycerol, acetylated monoglycerides, sucrose octa-acetate, triethyl ortho-acetate, or combinations thereof.

4. The food product of claim 1, wherein said acidulant precursor comprises an ethyl ester.

5. The food product of claim 4, wherein said ethyl ester is selected from the group consisting of ethyl pyruvate, ethyl acetate, ethyl lactate, diethyl fumarate, or combinations thereof.

6. The food product of claim 1, wherein said acidulant precursor hydrolyzes to hydrolysis products, wherein at least one of said hydrolysis products is a gluten plasticizer.

7. The food product of claim 1, wherein said acidulant precursor hydrolyzes to hydrolysis products, wherein at least one of said hydrolysis products is a sweetener.

8. The food product of claim 1, wherein said acidulant precursor hydrolyzes to hydrolysis products, wherein at least one of said hydrolysis products is an antimicrobial.

9. The food product of claim 1, wherein said alkaline carbonate is a bicarbonate.

10. The food product of claim 1, wherein said acidulant precursor is present in an amount in excess of that required to neutralize the alkaline bicarbonate.

11. A dough comprising flour, gluten, water, a chemical leavener system comprising an acidulant precursor and an alkaline carbonate, and an enzyme for hydrolyzing the acidulant precursor, wherein the majority of carbon dioxide gas provided by said chemical leavener system is created by reaction of an alkaline carbonate with an acid that is the hydrolysis product of said acidulant precursor.

12. The dough of claim 11, wherein said flour comprises wheat flour, and said enzyme is a component of said wheat flour.

13. The dough of claim 11, wherein said flour comprises wheat flour, and said gluten is a component of said wheat flour.

14. The dough of claim 11, wherein said acidulant precursor comprises an acetyl compound.

15. The dough of claim 14, wherein said acetyl compound is selected from the group consisting of triacetyl glycerol, diacetyl glycerol, acetylated monoglycerides, sucrose octaacetate, triethyl ortho-acetate, or combinations thereof.

16. The dough of claim 11, wherein said acidulant precursor comprises an ethyl ester.

17. The dough of claim 16, wherein said ethyl ester is selected from the group consisting of ethyl pyruvate, ethyl acetate, ethyl lactate, diethyl fumarate, or combinations thereof.

18. The dough of claim 11, wherein said acidulant precursor hydrolyzes to hydrolysis products, wherein at least one of said hydrolysis products is a gluten plasticizer.

19. The dough of claim 11, wherein said acidulant precursor hydrolyzes to hydrolysis products, wherein at least one of said hydrolysis products is a sweetener.

20. The dough of claim 11, wherein said acidulant precursor hydrolyzes to hydrolysis products, wherein at least one of said hydrolysis products is an antimicrobial.

21. The dough of claim 11, wherein said alkaline carbonate is a bicarbonate.

22. The dough of claim 11, wherein said dough is refrigerated.

23. The dough of claim 11, wherein said dough is frozen.

24. A batter comprising comprising flour, gluten, water, a chemical leavener system comprising an acidulant precursor and an alkaline carbonate, and an enzyme for hydrolyzing the acidulant precursor, wherein the majority of carbon dioxide gas provided by said chemical leavener system is created by reaction of an alkaline carbonate with an acid that is the hydrolysis product of said acidulant precursor.

25. The batter of claim 24, wherein said flour comprises wheat flour, and said enzyme is a component of said wheat flour.

26. The batter of claim 24, wherein said flour comprises wheat flour, and said gluten is a component of said wheat flour.

27. The batter of claim 24, wherein said acidulant precursor comprises an acetyl compound.

28. The batter of claim 27, wherein said acetyl compound is selected from the group consisting of triacetyl glycerol, diacetyl glycerol, acetylated monoglycerides, sucrose octaacetate, triethyl ortho-acetate, or combinations thereof.

29. The batter of claim 24, wherein said acidulant precursor comprises an ethyl ester.

30. The batter of claim 29, wherein said ethyl ester is selected from the group consisting of ethyl pyruvate, ethyl acetate, ethyl lactate, diethyl fumarate, or combinations thereof.

31. The batter of claim 24, wherein said acidulant precursor hydrolyzes to hydrolysis products, wherein at least one of said hydrolysis products is a sweetener.

32. The batter of claim 24, wherein said acidulant precursor hydrolyzes to hydrolysis products, wherein at least one of said hydrolysis products is an antimicrobial.

33. The batter of claim 24, wherein said alkaline carbonate is a bicarbonate.

34. The batter of claim 24, wherein said batter is refrigerated.

35. The batter of claim 24, wherein said batter is frozen.

36. A method of preparing a dough or batter product comprising the steps of combining flour, gluten, water, a chemical leavener system comprising an acidulant precursor and an alkaline carbonate, and an enzyme for hydrolyzing the acidulant precursor, wherein the majority of carbon dioxide gas provided by said chemical leavener system when used in said dough or batter is created by reaction of an alkaline carbonate with an acid that is the hydrolysis product of said acidulant precursor.

37. The method of claim 36, wherein the ingredients are combined simultaneously.

38. The method of claim 36, wherein the ingredients are combined in stages.

39. The method of claim 36, comprising the steps of
   a. preparing a first stage pre-mix comprising flour, gluten, water, an acidulant precursor, and an enzyme for hydrolyzing the acidulant precursor,
   b. preparing a second stage pre-mix comprising shortening and an alkaline carbonate, and;
   c. combining the first stage premix and second stage premix to form a batter or dough.

40. The method of claim 36, wherein the product is a dough product, and wherein the method further comprising the step of extruding the dough through an extruder.

41. The method of claim 36, further comprising the step of cooking the batter or dough product.

42. The method of claim 40, wherein the product is baked.

43. The method of claim 36 further comprising the step of freezing the batter or dough product.

44. The method of claim 36 further comprising the step of refrigerating the batter or dough product.

45. The product made by the process of claim 36.

* * * * *

UNITED STATES PATENT AND TRADEMARK OFFICE
CERTIFICATE OF CORRECTION

PATENT NO. : 6,824,807 B2
DATED : November 30, 2004
INVENTOR(S) : Huang et al.

It is certified that error appears in the above-identified patent and that said Letters Patent is hereby corrected as shown below:

<u>Column 15,</u>
Line 51, "24.   A batter comprising comprising flour, gluten,..." should be
-- 24.   A batter comprising flour, gluten,... --

Signed and Sealed this

Seventh Day of June, 2005

JON W. DUDAS
*Director of the United States Patent and Trademark Office*